(12) United States Patent
Shida et al.

(10) Patent No.: US 9,689,751 B2
(45) Date of Patent: Jun. 27, 2017

(54) OPTICAL FIBER TEMPERATURE DISTRIBUTION MEASUREMENT DEVICE AND METHOD OF MEASURING OPTICAL FIBER TEMPERATURE DISTRIBUTION

(71) Applicant: YOKOGAWA ELECTRIC CORPORATION, Musashino-shi, Tokyo (JP)

(72) Inventors: Hideo Shida, Musashino (JP); Kazushi Oishi, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 593 days.

(21) Appl. No.: 14/192,138

(22) Filed: Feb. 27, 2014

(65) Prior Publication Data

US 2014/0254629 A1 Sep. 11, 2014

(30) Foreign Application Priority Data

Mar. 6, 2013 (JP) ................................. 2013-044272

(51) Int. Cl.
*G01J 5/08* (2006.01)
*G01K 3/06* (2006.01)
*G01K 11/32* (2006.01)

(52) U.S. Cl.
CPC ........ *G01K 11/32* (2013.01); *G01K 2011/324* (2013.01)

(58) Field of Classification Search
CPC ... G01J 5/00; G01J 5/08; G01K 11/32; G01K 3/06
See application file for complete search history.

(56) References Cited

U.S. PATENT DOCUMENTS 4,968,880 A 11/1990 Beller
5,667,300 A * 9/1997 Mandelis ............... G01N 25/18
257/E21.53
(Continued)

FOREIGN PATENT DOCUMENTS

CN 102564642 U * 7/2012
CN 202631155 U * 12/2012
(Continued)

*Primary Examiner* — Gail Kaplan Verbitsky
(74) *Attorney, Agent, or Firm* — Sughrue Mion, PLLC

(57) ABSTRACT

An optical fiber temperature distribution measurement device for measuring a temperature distribution along a longitudinal direction of an optical fiber is provided. The device includes: a light transmitter configured to input a train of code-modulated light pulses into the optical fiber; a light receiver configured to receive Raman back scattering lights generated by inputting the train of code-modulated light pulses into the optical fiber; a demodulator configured to perform a correlation processing between a measured signal output from the light receiver and a code string associated with a type of the code modulation performed by the light transmitter, and to demodulate the measured signal; a storage storing a correction data to be used to correct a distortion of the measured signal output from the light receiver when an impulsive pulsed light is output from the light transmitter; and a corrector configured to perform a correction to one of the measured signal output from the light receiver and a demodulated signal output from the demodulator, using the correction data stored in the storage.

15 Claims, 7 Drawing Sheets

(56) References Cited

U.S. PATENT DOCUMENTS

| | | | | |
|---|---|---|---|---|
| 5,763,948 | A * | 6/1998 | Sumi | H01L 23/485 257/763 |
| 7,006,769 | B1 * | 2/2006 | Kawasaki | G02F 1/0121 398/147 |
| 7,744,275 | B2 * | 6/2010 | Kawauchi | G01J 5/08 374/121 |
| 8,858,069 | B2 * | 10/2014 | Agawa | G01K 11/32 374/1 |
| 9,046,425 | B2 * | 6/2015 | Agawa | G01K 11/32 |
| 9,157,811 | B2 * | 10/2015 | Zhang | G01K 11/32 |
| 2001/0043792 | A1 * | 11/2001 | Mishima | H04N 9/8042 386/329 |
| 2002/0048437 | A1 * | 4/2002 | Nakamura | G02B 6/2551 385/96 |
| 2004/0105635 | A1 * | 6/2004 | Nandi | G01K 11/32 385/101 |
| 2007/0280329 | A1 * | 12/2007 | Kawauchi | G01J 5/08 374/131 |
| 2008/0246947 | A1 * | 10/2008 | Lees | G01K 11/32 356/51 |
| 2014/0153611 | A1 * | 6/2014 | Kasajima | G01K 15/00 374/130 |

FOREIGN PATENT DOCUMENTS

| | | | |
|---|---|---|---|
| JP | 01267428 A | * | 10/1989 |
| JP | H0743286 B2 | * | 5/1995 |
| JP | 2004235809 A | | 8/2004 |
| JP | 2011209121 A | * | 10/2011 |
| JP | 02011209121 A | * | 10/2011 |
| JP | 2011-242141 A | | 12/2011 |
| JP | 2011-242142 A | | 12/2011 |
| JP | CN 202195897 U | * | 4/2012 |

* cited by examiner

| TEMPERATURE [°C] | CORRECTION DATA | |
|---|---|---|
| | STOKES LIGHT | ANTI-STOKES LIGHT |
| 0 | d101 | d201 |
| 4 | d102 | d202 |
| 8 | d103 | d203 |
| 12 | d104 | d204 |
| 16 | d105 | d205 |
| 20 | d106 | d206 |
| 24 | d107 | d207 |
| 28 | d108 | d208 |
| 32 | d109 | d209 |
| 36 | d110 | d210 |
| 40 | d111 | d211 |
| ⋮ | ⋮ | ⋮ |

OPTICAL FIBER TEMPERATURE DISTRIBUTION MEASUREMENT DEVICE AND METHOD OF MEASURING OPTICAL FIBER TEMPERATURE DISTRIBUTION

BACKGROUND OF THE INVENTION

Field of the Invention

The present invention relates to an optical fiber temperature distribution measurement device configured to measure a temperature distribution of an optical fiber along a longitudinal direction of the optical fiber, and a method of measuring an optical fiber temperature distribution.

Priority is claimed on Japanese Patent Application No. 2013-044272, filed Mar. 6, 2013, the content of which is incorporated herein by reference.

Description of Related Art

There have been widely carried out research and developments regarding distribution measurement devices configured to use optical fiber as sensors and to measure the distribution of a physical quantity of optical fiber, wherein the distribution is defined in the longitudinal direction of the optical fiber. One of the distribution measurement devices is an optical fiber temperature distribution measurement device which is configured to measure a temperature distribution along the longitudinal direction of the optical fiber by measuring Raman back scattering light (Stokes light and anti-Stokes light) generated in the optical fiber. The optical fiber temperature distribution measurement device is also referred to as R-OTDR (Raman Optical Time Domain Reflectometry).

Specifically, the optical fiber temperature distribution measurement device described above is configured to repeatedly supplying a pulse of laser via a side of the optical fiber into the optical fiber and sequentially receiving Raman back scattering lights from the side of the optical fiber, where the Raman back scattering light is sequentially generated by propagating the laser in the optical fiber. The temperature distribution along the longitudinal direction of the optical fiber is obtained by calculating the intensity ratio of the Stokes light and the anti-Stokes light at each measuring point along the longitudinal direction of the optical fiber (to be exact, by calculating the ratio of the average value of the intensity of the Stokes light and the average value of the intensity of the anti-Stokes light).

Recently, an optical fiber temperature distribution measurement device, which improves a dynamic range by inputting a train of light pulses into an optical fiber and performing a correlation processing (a demodulation) for a received light signal obtained by receiving Raman back scattering lights from the optical fiber, has been achieved. A code modulation using Golay code or Barker code is performed for the train of light pulses. Japanese Unexamined Patent Application, First Publication No. 2011-242141 discloses a conventional optical fiber temperature distribution measurement device which is configured to measure a temperature distribution by inputting a train of light pulses into an optical fiber, wherein a code modulation using Golay code is performed for the train of light pulses. Japanese Unexamined Patent Application, First Publication No. 2011-242142 discloses a conventional optical fiber temperature distribution measurement device which can prevent measurement errors due to the temperature variation of the device itself.

In some cases, an optical fiber temperature distribution measurement device configured to measure the temperature distribution by inputting a train of light pulses, for which a code modulation using Golay code, etc. is performed, into an optical fiber, does not accurately modulate the train of light pulses input into the optical fiber depending on a feature of an light source or a driving circuit (the driving circuit configured to drive the light source). If the optical fiber temperature distribution is measured using such a train of light pulses, the device causes a deviation (an error) of the measured temperature at a point where a temperature varies significantly (a temperature variation point) and/or a point where a loss varies significantly (a loss variation point). As a method of correcting such a deviation, a method of correcting the deviation using data obtained near the point where the device causes the deviation may be used.

An intensity of a received light signal obtained by receiving Stokes light and anti-Stokes light from an optical fiber varies depending on the temperature of the optical fiber. Therefore, in some cases, even if the method described above is used, the expected correction of the deviation is not achieved and the accuracy of measurement degrades instead. Since each of a light emitter (the light emitter includes the light source and the driving circuit described above) and a light receiver provided in the optical fiber temperature distribution measurement device has a temperature dependency, and the degree of the deviation described above varies depending on the environmental temperature of the optical fiber temperature distribution measurement device, it is necessary to correct the deviation appropriately in consideration of the environmental temperature in order to improve the accuracy of measurement.

According to one aspect of the present invention, an optical fiber temperature distribution measurement device which improves an accuracy of measurement by appropriately correcting a deviation of a measured temperature at a temperature variation point and/or a loss variation point, and a method of measuring an optical fiber temperature distribution are provided.

SUMMARY

According to one aspect of the present invention, an optical fiber temperature distribution measurement device for measuring a temperature distribution along a longitudinal direction of an optical fiber is provided. The device may include: a light transmitter configured to input a train of code-modulated light pulses into the optical fiber; a light receiver configured to receive Raman back scattering lights generated by inputting the train of code-modulated light pulses into the optical fiber; a demodulator configured to perform a correlation processing between a measured signal output from the light receiver and a code string associated with a type of the code modulation performed by the light transmitter, and to demodulate the measured signal; a storage storing a correction data to be used to correct a distortion of the measured signal output from the light receiver when an impulsive pulsed light is output from the light transmitter; and a corrector configured to perform a correction to one of the measured signal output from the light receiver and a demodulated signal output from the demodulator, using the correction data stored in the storage.

In the optical fiber temperature distribution measurement device described above, the storage may store correction data associated with predetermined temperatures.

In the optical fiber temperature distribution measurement device described above, the device may include a temperature sensor configured to measure a temperature inside of the optical fiber temperature distribution measurement device. The corrector may be configured to read out of the storage the correction data associated with a temperature measured by the temperature sensor and to perform the correction.

In the optical fiber temperature distribution measurement device described above, the corrector may be configured to interpolate the correction data associated with temperatures close to the temperature measured by the temperature sensor when the temperature measured by the temperature sensor does not correspond to any one of the predetermined temperatures, and to perform the correction using the interpolated data.

In the optical fiber temperature distribution measurement device described above, the light receiver may include a first light receiving circuit configured to receive stokes light included in the Raman back scattering lights and a second light receiving circuit configured to receive anti-stokes light included in the Raman back scattering lights. The storage may store a first correction data to be used to correct a distortion of a measured signal associated with the stokes light and a second correction data to be used to correct a distortion of a measured signal associated with the anti-stokes light as the correction data. The corrector may be configured to correct a measured signal associated with the stokes light output from the light receiver or a demodulated signal associated with the stokes light output from the demodulator using the first correction data, and to correct a measured signal associated with the anti-stokes light output from the light receiver or a demodulated signal associated with the anti-stokes light output from the demodulator using the second correction data.

In the optical fiber temperature distribution measurement device described above, the demodulator may be configured to combine a function of the corrector, and to perform the demodulation and the correction simultaneously.

In the optical fiber temperature distribution measurement device described above, the corrector may be configured to perform a convolution of the correction data and the demodulated signal and to correct the demodulated signal, or to perform a convolution of the correction data and the measured signal and to correct the measured signal.

In the optical fiber temperature distribution measurement device described above, the light transmitter may include a code generator and a light source. The code generator may be configured to generate a driving signal and to input the driving signal into the light source, and the driving signal makes a train of light pulses output from the light source into a train of code-modulated light pulses.

In the optical fiber temperature distribution measurement device described above, the device may further include an averaging circuit configured to operate by a timing signal from the code generator and to average data output from the demodulator, the data being generated every time each the train of light pulses output multiple times from the light source is input into the optical fiber.

In the optical fiber temperature distribution measurement device described above, the device may further include an operation unit configured to perform an operation to calculate an intensity ratio of a data associated with the stokes light corrected by the corrector and a data associated with the anti-stokes light corrected by the corrector, and to measure the temperature distribution along the longitudinal direction of the optical fiber.

According to another aspect of the present invention, a method of measuring an optical fiber temperature distribution is provided. The method may include: a step of inputting a train of code-modulated light pulses into an optical fiber; a step of receiving Raman back scattering lights generated by inputting the train of code-modulated light pulses into the optical fiber; a step of performing a correlation processing between the measured signal received in the receiving step and a code string associated with a type of the code modulation and demodulating the measured signal; a step of correcting a demodulated signal demodulated in the demodulating step, using a correction data to be used to correct a distortion of the measured signal; and a step of measuring a temperature distribution along a longitudinal direction of the optical fiber using a corrected signal corrected in the correcting step.

In the method of measuring the optical fiber temperature distribution described above, the correction data may include a correction data associated with predetermined temperatures.

In the method of measuring the optical fiber temperature distribution described above, the correcting step may include a step of measuring a temperature inside of an optical fiber temperature distribution measurement device, and a step of correcting the demodulated signal using to the correction data associated with the temperature measured in the measuring step.

In the method of measuring the optical fiber temperature distribution described above, the correcting step may interpolate the correction data associated with temperatures close to the temperature measured in the measuring step when the measured temperature does not correspond to any one of the predetermined temperatures, and corrects the demodulated signal using an interpolated data.

In the method of measuring the optical fiber temperature distribution described above, the correction data may include a first correction data to be used to correct a distortion of a measured signal associated with stokes light included in the Raman back scattering lights and a second correction data to be used to correct a distortion of a measured signal associated with anti-stokes light included in the Raman back scattering lights. The receiving step may receive the stokes light and the anti-stokes light. The demodulating step may demodulate the stokes light and the anti-stokes light. The correcting step may correct a demodulated signal associated with the stokes light using the first correction data, and corrects a demodulated signal associated with the anti-stokes light using the second correction data.

In the method of measuring the optical fiber temperature distribution described above, the demodulating step and the correcting step may be performed simultaneously.

In the method of measuring the optical fiber temperature distribution described above, the correcting step may perform a convolution of the correction data and the demodulated signal to correct the demodulated signal.

In the method of measuring the optical fiber temperature distribution described above, the inputting step may include a step of inputting a driving signal into a light source, and a step of outputting a train of code-modulated light pulses associated with the driving signal from the light source.

In the method of measuring the optical fiber temperature distribution described above, the method may further include, between the demodulating step and the correcting step, a step of averaging the demodulated signals generated every time each the train of light pulses output multiple times from the light source is input into the optical fiber.

In the method of measuring the optical fiber temperature distribution described above, the measuring step may perform an operation to calculate an intensity ratio of a data associated with the stokes light corrected in the correcting step and a data associated with the anti-stokes light in the correcting step and measures the temperature distribution along the longitudinal direction of the optical fiber.

According to one aspect of the present invention, a storage previously stores a correction data which corrects a deviation of a measured signal received by a light receiver in a case that a light emitter outputs an impulsive pulsed light, and a corrector is configured to correct a demodulated signal output from a demodulator or the measured signal output from the light receiver using the correction data stored in the storage. Therefore, a deviation of a measured temperature at a temperature variation point and/or a loss variation point is corrected appropriately, and an accuracy of measurement is improved.

DETAILED DESCRIPTION OF THE INVENTION

Hereinafter, an optical fiber temperature distribution measurement device in accordance with one embodiment of the present invention will be described with reference to the drawings.

First Embodiment

Figure 1:
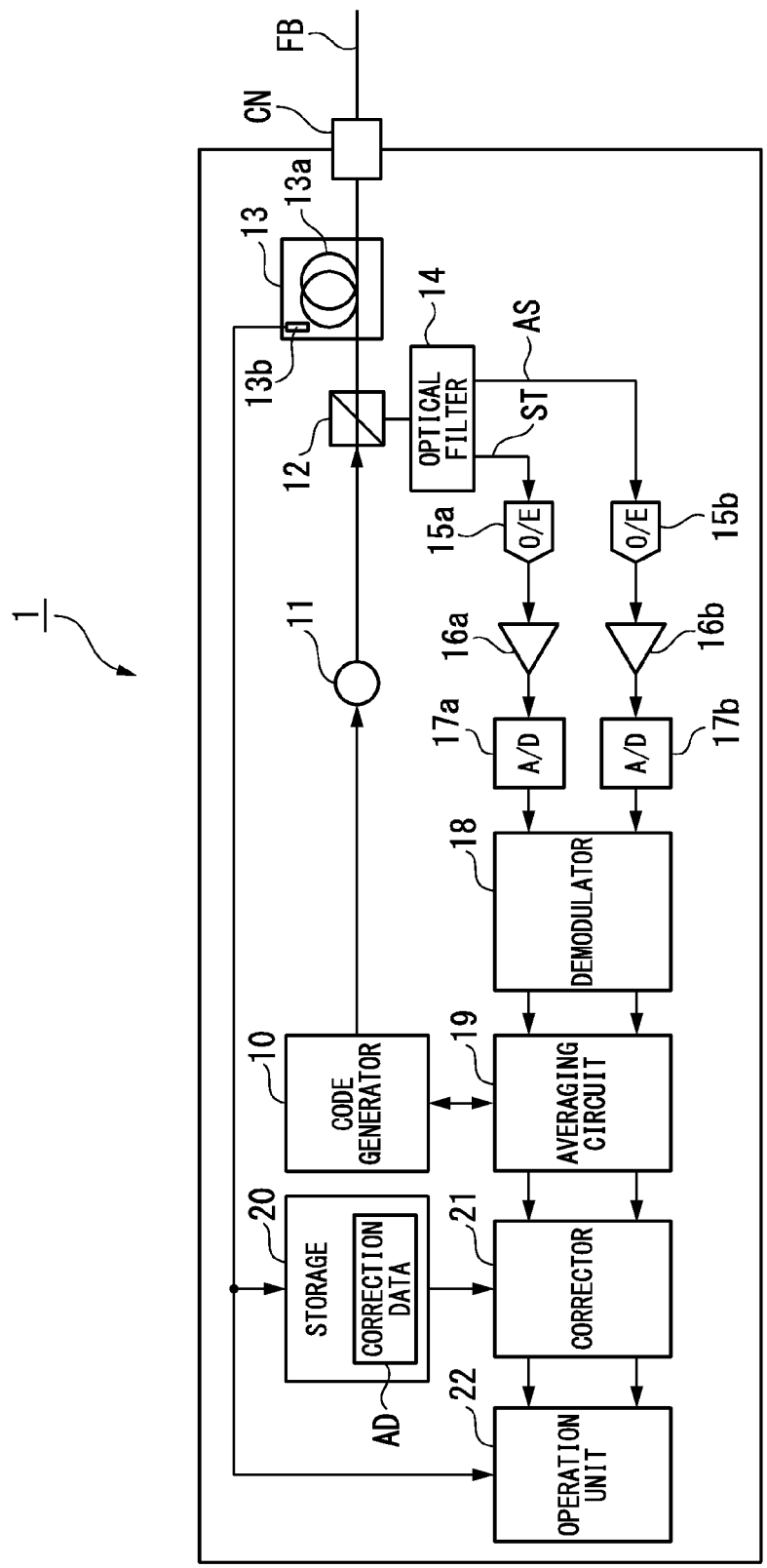
FIG. 1 is a block diagram illustrating main components of an optical fiber temperature distribution measurement device in accordance with a first embodiment of the present invention.

FIG. 1 is a block diagram illustrating main components of an optical fiber temperature distribution measurement device in accordance with a first embodiment of the present invention. As illustrated in FIG. 1, an optical fiber temperature distribution measurement device 1 in accordance with the first embodiment includes a code generator 10 (a light emitter), a light source 11 (a light emitter), a directional coupler 12, a temperature reference unit 13, an optical filter 14 (a light receiver), photoelectric conversion circuits (O/E) 15a and 15b (a light receiver), amplifier circuits 16a and 16b, A/D conversion circuits 17a and 17b, a demodulator 18, an averaging circuit 19, a storage 20, a corrector 21, and an operation unit 22.

The optical fiber temperature distribution measurement device 1 is an optical fiber measurement device (R-OTDR) which is configured to receive Raman back scattering lights (Stokes light and anti-Stokes light) generated in an optical fiber FB in connection with a connector CN and to measure a temperature distribution along a longitudinal direction of the optical fiber FB. A silica based multi-mode optical fiber which has a length of, for example, a range of approximately several kilometers to approximately several tens of kilometers may be used as the optical fiber FB. A single-mode optical fiber may also be used as the optical fiber FB.

The code generator 10 is configured to generate a driving signal (a code) which makes a train of light pulses output from the light source 11 into a train of light pulses code-modulated using Golay code, and to input the driving signal into the light source 11. The code generator 10 is configured to output, in addition to the driving signal, a timing signal which defines a timing to operate the averaging circuit 19. The Golay code of n bit (for example, 64 bit) includes two types of code string A0 and B0 represented by a following equation (1). A0 and B0 are bipolar correlated code including elements of (−1) and (+1).

$$A0: a_1, a_2, a_3, \ldots, a_n$$

$$B0: b_1, b_2, b_3, \ldots, b_n \quad (1)$$

The light source 11 includes, for example, a semiconductor laser, etc., and is configured to output a pulse of laser at the timing of the output of the driving signal from the code generator 10. Thereby, the light source 11 outputs the train of light pulses in response to the driving signal described above. A wavenumber of the laser output from the light source 11 is defined as k0. The directional coupler 12 is configured to optically connect the light source 11, the temperature reference unit 13, and the light filter 14 so that the laser output from the light source 11 is directed to the temperature reference unit 13 and the back scattering light generated in the optical fiber FB is directed to the optical filter 14.

The temperature reference unit 13 includes a winding optical fiber 13a and a temperature sensor 13b and is configured to determine the temperature (the reference temperature) inside the optical fiber temperature distribution measurement device 1. One end of the optical fiber 13a is optically in connection with the directional coupler 12, while the other end of the optical fiber 13a is optically in connection with the connector CN (one end of the optical fiber FB is in connection with the connector). The optical fiber 13a has an entire length of a range of approximately several tens to approximately several hundreds of meters. The temperature sensor 13b includes, for example, a platinum resistance temperature detector, and is configured to measure a temperature near the optical fiber 13a. Measuring results of the temperature sensor 13b are input into the storage 20, the corrector 21, and the operation unit 22.

The optical filter 14 is configured to extract the Raman back scattering light (the Stokes light ST and the anti-Stokes light AS) included in the back scattering light output from the directional coupler 12, and to separate and output the Stokes light ST and the anti-Stokes light AS. Given Raman shift (wavenumber) generated in the optical fiber FB is defined as kr, the wavenumber of the Stokes light ST is represented by k0−kr and the wavenumber of the anti-Stokes light AS is represented by k0+kr.

Each of the photoelectric conversion circuit 15a (a first light receiving circuit) and the photoelectric conversion circuit 15b (a second light receiving circuit) includes a light receiving element, for example, an avalanche photodiode and is configured to photoelectrically convert each of the Stokes light ST and the anti-Stokes light AS output from the optical filter 14. Each of the amplifier circuits 16a and 16b is configured to amplifier photoelectric conversion signals at a predetermined amplification factor, wherein the photoelectric conversion signals are output from the photoelectric conversion circuits 15a and 15b.

The A/D conversion circuits 17a and 17b are configured to sample the photoelectric conversion signals amplified by the amplifier circuits 16a and 16b, respectively, and to output digitized sample data. The operation timings of the A/D conversion circuits 17a and 17b are defined so that the A/D conversion circuits 17a and 17b sample the photoelectric conversion signals of the Raman back scattering light (the Stokes light ST and the anti-Stokes light AS) generated at sampling points (measuring points). The sampling points are set at constant intervals (for example, at intervals of 1 meter) along the longitudinal direction of the optical fiber FB. The position of the connector CN is defined as an origin.

The demodulator 18 is configured to demodulate the sample data output from the A/D conversion circuits 17a and 17b by performing a correlation processing of the sample data and the Golay code used for the code generator 10. Specifically, the demodulator 18 is configured to calculate signal intensity Q1 of each sample data output from the A/D conversion circuits 17a and 17b by calculating a cross-correlation represented by a following equation (2) for each sample data output from the A/D conversion circuits 17a and 17b.

$$Q1 \propto A0 \circledast [S(A+)-S(A-)] + B0 \circledast [S(B+)-S(B-)] \quad (2)$$

The group of the terms S(A+), S(A−), S(B+), and S(B−) in the equation (2) is a sample data group which is obtained by inputting each the train of light pulses, which are demodulated by the code string A+, A−, B+, and B−, into the optical fiber FB. The operator (the operator represented by adding the symbol "x" to the inside of the symbol "○") indicates a convolution.

The averaging circuit 19 is configured to operate in accordance with the timing signals output from the code generator 10, and to average each of the sample data groups (the sample data group associated with the Stokes light ST and the sample data group associated with the anti-Stokes light AS). The sample data groups are obtained from the demodulator 18 every time each the train of light pulses output several times from the light source 11 is input into the optical fiber FB. Since the Raman back scattering light (the Stokes light ST and the anti-Stokes light AS) generated in the optical fiber FB is weak, a desired ratio of a signal to a noise (S/N ratio) is obtained by averaging the sample data, wherein the sample data are obtained by inputting several times the laser into the optical fiber FB.

The storage 20 stores a correction data AD which corrects the deviation of the sample data group output from the averaging circuit 19 (the sample data group associated with the Stokes light ST and the sample data group associated with the anti-Stokes light AS). The correction data AD corrects a deviation of an impulse response obtained at a point where a temperature varies significantly (a temperature variation point) and/or a point where a loss varies significantly (a loss variation point).

Figures 2, 3:
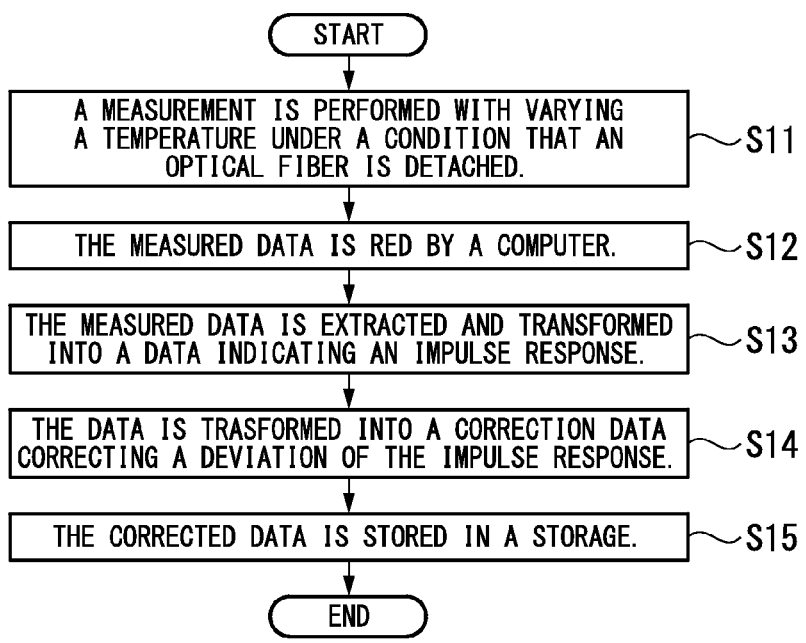
FIG. 2 is a diagram illustrating a correction data used for the optical fiber temperature distribution measurement device in accordance with the first embodiment of the present invention.
FIG. 3 is a flow chart illustrating a method of calculating the correction data in accordance with the first embodiment of the present invention.

FIG. 2 is a diagram illustrating a correction data used for the optical fiber temperature distribution measurement device in accordance with the first embodiment of the present invention. As illustrated in FIG. 2, the correction data AD includes a correction data (a first correction data) which corrects a deviation of the sample data group associated with the Stokes light ST and a correction data (a second correction data) which corrects a deviation of the sample data group associated with the anti-Stokes light AS. Since the feature of the optical filter 14 varies depending on the Stokes light ST and the anti-Stokes light AS and the feature of the photoelectric conversion circuits 15a and 15b varies depending on the Stokes light ST and the anti-Stokes light AS, the correction data associated with the Stokes light ST and the correction data associated with the anti-Stokes light AS are provided separately.

As illustrated in FIG. 2, the correction data associated with the Stokes light ST and the correction data associated with the anti-Stokes light AS at each of predetermined temperatures are prepared (at the interval of 4° C. in the example illustrated in FIG. 2). Since the features of the light source 11, the optical filter 14, and the photoelectric conversion circuits 15a and 15b vary depending on the temperature, the correction data at each the predetermined temperatures are prepared. Since the temperature variation due to the deviation is approximately 0.5° C. when the temperature variation at the temperature variation point is 20° C., the accuracy of measurement which can measure a temperature difference of approximately 0.1° C. is achieved by preparing the temperature data at the interval of 4° C. as illustrated in FIG. 2.

In FIG. 2, in order to facilitate understanding of the first embodiment, the correction data associated with the Stokes light ST at the interval of 4° C. from 0° C. (0° C., 4° C., 8° C., . . . ) are represented by d101, d102, d103, . . . , respectively, and the correction data associated with the anti-Stokes light AS are represented by d201, d202, d203, . . . , respectively. Each the correction data does not include only one data, but includes a plurality of data (a data train or a data group).

As described in detail hereinafter, the correction data AD is obtained by reading out a sample data group (the sample data group is obtained by the averaging circuit 19) using a computer (not shown) and carrying out an operation for the readout sample data, wherein the sample data group is generated by inputting the pulsed light into the optical fiber 13a provided in the temperature reference unit 13 when the optical fiber FB is not in connection with the connector CN. In order to obtain a more accurate impulse response at the temperature variation point and/or the loss variation point, not the optical fiber FB, but the optical fiber 13a is used for obtaining the correction data AD. The storage 20 previously stores the obtained correction data AD before the optical fiber FB is connected with the connector CN and the measurement is started.

The corrector 21 is configured to correct each sample data groups (the sample data group associated with the Stokes light ST and the sample data group associated with the anti-Stokes light AS) output from the averaging circuit 19 using the correction data AD stored in the storage 20. Specifically, the corrector 21 is configured to read out from the storage 20 the correction data AD associated with the temperature indicated by the measured result of the temperature sensor 13b and to perform a convolution of the readout correction data AD and the sample data group associated with the Stokes light ST and a convolution of the readout correction data AD and the sample data group associated with the anti-Stokes light AS.

If the correction data AD associated with the temperature indicated by the measured result of the temperature sensor 13b is not stored in the storage 20, the corrector 21 may be configured to read out from the storage 20 a plurality of correction data AD associated with temperatures close to the temperature indicated by the measured result of the temperature sensor 13b and to perform the correction described above using data obtained by interpolating a plurality of the readout data. For example, if the temperature indicated by the measured result of the temperature sensor 13b is 26° C., the corrector 21 reads out the correction data "d107" and "d207" associated with temperature 24° C. and the correction data "d108" and "d208" associated with temperature 28° C. illustrated in FIG. 2. The corrector 21 obtains a correction data of the Stokes light ST at 26° C. by performing a liner interpolation of the correction data "d107" and "d108". The corrector 21 corrects the sample data group associated with the Stokes light ST using the correction data of the Stokes light associated with temperature 26° C. obtained by this interpolation. Moreover, the corrector 21 obtains a correction data of the anti-Stokes light at 26° C. by performing a liner interpolation of the correction data "d207" and "d208". The corrector 21 corrects the sample data group associated with the anti-Stokes light AS using the correction data of the anti-Stokes light associated with temperature 26° C. obtained by this interpolation.

The operation unit 22 is configured to calculate an intensity ratio at each of the sampling points (the measuring points) using the sample data group associated with the Stokes light ST corrected by the corrector 21 and the sample data group associated with the anti-Stokes light AS corrected by the corrector 21 with reference to the measurement results of the temperature sensor 13b. For example, the operation unit 20 is configured to calculate an intensity ratio of the anti-Stokes light AS to the Stokes light ST (the intensity of the anti-Stokes light AS/the intensity of the Stokes light ST). Since the intensity ratio varies depending on a temperature, the temperature at each of the sampling points is obtained by this calculation. Thereby, the temperature distribution along the longitudinal direction of the optical fiber FB is obtained.

The operation of the optical fiber temperature distribution measurement device 1 in accordance with the first embodiment will be described. Hereinafter, first, a method of obtaining the correction data AD used for the optical fiber temperature distribution measurement device 1 (hereinafter, refer to the method of obtaining the correction data AD as "a correction data calculation method") will be described, and then, an operation of the optical fiber temperature distribution measurement device 1 measuring a temperature distribution along the longitudinal direction of the optical fiber FB using the optical fiber FB (hereinafter, refer to the operation measuring the temperature distribution as "a temperature distribution measurement operation") will be described.

<Correction Data Calculation Method>

FIG. 3 is a flow chart illustrating a method of calculating the correction data in accordance with the first embodiment of the present invention. As illustrated in FIG. 3, first, an operation to measure a feature of the optical fiber 13a with varying the temperature inside the optical fiber temperature distribution measurement device 1 is performed (step S11). This operation is performed when the optical fiber FB is detached from the connector CN of the optical fiber temperature distribution measurement device 1.

Specifically, after the internal temperature of the optical fiber temperature distribution measurement device 1 is set at a target temperature, an operation to input the pulsed light output from the light source 11 into the optical fiber 13a and to measure the Raman back scattering lights (the Stokes light ST and the anti-Stokes light AS) obtained from the optical fiber 13a with varying the target temperature is performed. The Raman back scattering lights (the Stokes light ST and the anti-Stokes light AS) obtained from the optical fiber 13a are directed to the optical filter 14 by the directional coupler 12. The optical filter 14 is configured to extract the Raman back scattering light (the Stokes light ST and the anti-Stokes light AS) included in the back scattering light output from the directional coupler 12, and to separate and output the Stokes light ST and the anti-Stokes light AS. The photoelectric conversion circuits 15a and 15b are configured to photoelectrically convert the Stokes light ST and the anti-Stokes light AS output from the optical filter 14, respectively. The amplifier circuits 16a and 16b are configured to amplifier photoelectric conversion signals output from the photoelectric conversion circuits 15a and 15b at a predetermined amplification factor, respectively. The A/D conversion circuits 17a and 17b are configured to sample the photoelectric conversion signals amplified by the amplifier circuits 16a and 16b, respectively, and to output digitized sample data. The demodulator 18 is configured to demodulate the sample data output from the A/D conversion circuits 17a and 17b by performing a correlation processing of the sample data and the Golay code used for the code generator 10. The averaging circuit 19 is configured to operate in accordance with the timing signals output from the code generator 10, and to average each of the sample data groups (the sample data group associated with the Stokes light ST and the sample data group associated with the anti-Stokes light AS). The sample data groups are obtained from the demodulator 18 every time each the train of light pulses output several times from the light source 11 is input into the optical fiber FB. Thereby, the sample data group associated with the Stokes light ST and the sample data group associated with the anti-Stokes light AS at the target temperature are obtained by the averaging circuit 19.

After the operations described above are finished, an operation to read out the measured sample data group using a computer is performed (step S12). For example, an operation to connect a personal computer with the optical fiber temperature distribution measurement device 1 and to read out the sample data groups at each temperature obtained by the averaging circuit 19 (the sample data group associated with the Stokes light ST and the sample data group associated with the anti-Stokes light AS) using the personal computer is performed.

After the readout of the sample data groups is finished, then, an operation to process the readout sample data group at each temperature (a extraction processing and a synthesizing processing) and to transform the sample data group at each temperature into a data indicating an impulse response is performed using the computer (step S13). In order to obtain the impulse response without greatly increasing the cost of the optical fiber temperature distribution measurement device 1, such transformation is performed.

In order to obtain the impulse response, normally, it is necessary to output a pulsed light having a significant narrow pulse width from the light source 11, to input the pulsed light into the optical fiber 13a, and to measure Raman back scattering lights generated in the optical fiber 13a. However, it is necessary to change the configuration of the optical fiber temperature distribution measurement device 1 in order to narrow the pulse width of pulsed light output from the light source 11. This results in a great increase of cost. Therefore, in the first embodiment, the impulse response is obtained without greatly increasing the cost by performing the data processing for the sample data group and obtaining the pseudo impulse response.

Figure 4:
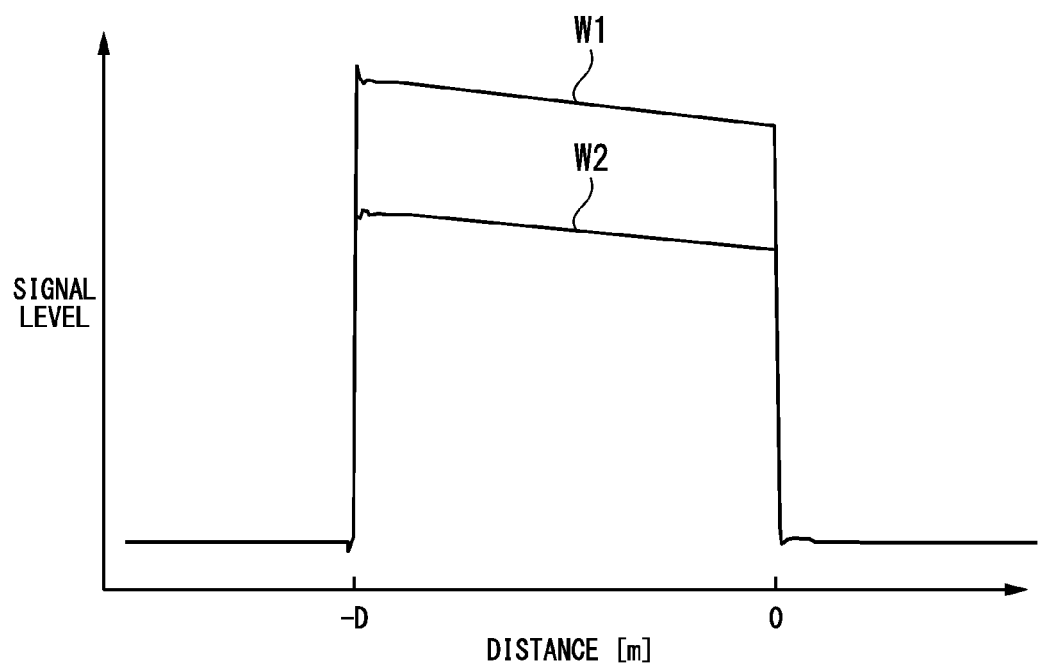
FIG. 4 is a diagram illustrating an example of a waveform of sample data group used for calculating the correction data in accordance with the first embodiment of the present invention.

FIG. 4 is a diagram illustrating an example of a waveform of sample data group used for calculating the correction data in accordance with the first embodiment of the present invention. In FIG. 4, the horizontal axis indicates a distance given the position of the connector CN is defined as an origin, and the vertical axis indicates a signal level of Raman back scattering light. One end of the optical fiber 13a (the pulse light output from the light source 11 is input into this one end) is disposed at the position which is distant from the connector CN in the direction of the light source 11 by a distance D meter (the position indicated by the distance—D meter).

In FIG. 4, a curve indicated by a reference W1 is a waveform of the sample data group associated with the Stokes light ST and a curve indicated by a reference W2 is a waveform of the sample data group associated with the anti-Stokes light AS. These waveforms W1 and W2 indicate that both the signal level of the sample data group associated with the Stokes light ST and the signal level of the sample data group associated with the anti-Stokes light AS rapidly increase at one end of the optical fiber 13a (the position indicated by the distance—D meter), gradually decrease in the optical fiber 13a, and rapidly decrease at the position of the connector CN (origin). Generally, the signal level of the sample data group associated with the Stokes light ST is higher than the signal level of the sample data group associated with the anti-Stokes light AS.

If the sample data groups which indicates the variation of the signal level illustrated in FIG. 4 are obtained, the sample data group at the position where the signal level rapidly increases (the position indicated by the distance—D meter) and the sample data group at the position where the signal level rapidly decreases (origin) are extracted, and the extracted sample data groups are synthesized. This process results in that the sample data group at the part where the signal level gradually decreases (the part corresponding to the inside of the optical fiber 13a) is excluded, thereby, the data indicating the pseudo impulse response illustrated in FIG. 5 is obtained.

Figure 5:
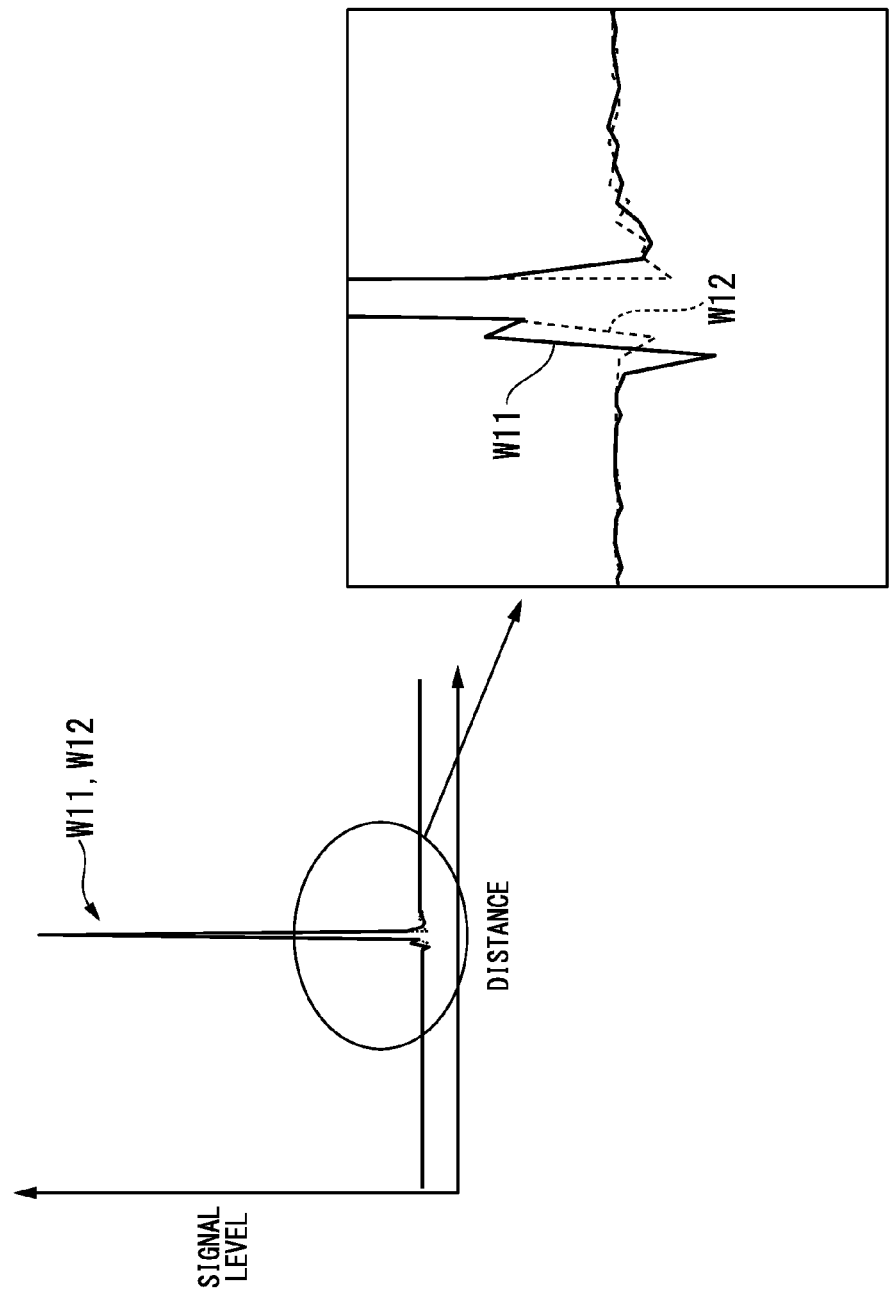
FIG. 5 is a diagram illustrating a waveform of a data indicating a pseudo impulse response used for calculating the correction data in accordance with the first embodiment of the present invention.

FIG. 5 is a diagram illustrating a waveform of a data indicating a pseudo impulse response used for calculating the correction data in accordance with the first embodiment of the present invention. In FIG. 5, a curve indicated by a reference W11 is a waveform of a data obtained by performing a data processing for the sample data group associated with the Stokes light ST and a curve indicated by a reference W12 is a waveform of a data obtained by performing a data processing for the sample data group associated with the anti-Stokes light AS.

FIG. 5 shows that both the waveform W11 and W12 generally indicate the variation in accordance with σ function. The waveform are disturbed at the starting point of the rapid increase of the signal level and the ending point of the rapid decrease of the signal level, thus, the deviation of the impulse response is generated. FIG. 5 shows that the deviation of the impulse response associated with the Stokes light ST and the deviation of the impulse response associated with the anti-Stokes light AS are different each other. The reason of this difference is that the feature of the optical filter 14 for the Stokes light ST and that of the anti-Stokes light AS are different each other and the feature of the photoelectric conversion circuits 15a and 15b for the Stokes light ST and that of the anti-Stokes light AS are different each other.

After the process described above is finished, a process to transform the data indicating the pseudo impulse response at each temperature measured in step S13 into the correction data AD correcting the deviation of the impulse response is performed using a computer (step S14). Specifically, a process to calculate a data $h^{-1}(i)$ which satisfies a relation represented by a following equation (3) is performed, where $h(i)$ is the data obtained in step S13. Namely, the process to calculate data $h^{-1}(i)$ which satisfies a condition that a result obtained by performing a convolution of data $h(i)$ and data $h^{-1}(i)$ is "000 . . . 00100 . . . 000" is performed.

$$h \otimes h^{-1} = 1 \tag{3}$$

For ease of explanation, given $h=\{a, b, c, d, e\}$ and $h^{-1}=\{A, B, C, D, E\}$, in the process of step S14, for example, a process to divide the data into the first half of data including the center (a, b, c) and (A, B, C) and the last half of data (d, e) and (D, E), and to calculate a data $h^{-1}(i)$ which satisfies the relation represented by the equation (3) for each of the first half of data and the last half of data is performed.

For example, the operation represented by the equation (3) for the first half of data (a, b, c) and (A, B, C) results in a following equation (4).

$$h \otimes h^{-1} = \{aA, aB+bA, aC+bB+cA, bC+cB, cC\} \tag{4}$$

The operation to calculate a data (A, B, C) which satisfies a condition that the equation (4) is equal to $\{0, 0, 0, 0, 1\}$ is performed. Thereby, $C=1/c$, $B=-b/c^2$, and $A=-a/c^2+b/c^3$ are obtained. A similar operation to that for the first half of data is performed for the last half of data. By performing the processes described above, the correction data to correct the deviation of the impulse response is obtained.

After the process described above is finished, a process to store the obtained correction data AD at each temperature in the storage 20 of the optical fiber temperature distribution measurement device 1 is performed (step S 15). For example, the process to connect again the personal computer with the optical fiber temperature distribution measurement device 1 and to store a correction data AD at each temperature obtained using the personal computer (a correction data associated with the Stokes light ST and a correction data associated with the anti-Stokes light AS) in the storage 20.

<Temperature Distribution Measuring Operation>

After the operation of the optical fiber temperature distribution measurement device 1 is started, an driving signal is output from the code generator 10 toward the light source 11, and train of light pulses code-modulated using Golay code are sequentially output from the light source 11 based on the driving signal. This train of light pulses is input into the optical fiber FB through the directional coupler 12, the temperature reference unit 13, and the connector CN in this order, and propagates in the optical fiber FB. If the train of light pulses propagates in the optical fiber FB, back scattering light including Raman back scattering light (Stokes light ST and anti-Stokes light AS) is generated. This back scattering light propagates in the optical fiber FB in a direction against the direction of movement of the train of light pulses and is input into the optical filter 14 through the connector CN, the temperature reference unit 13, and the directional coupler 12, in this order. Next, the optical filer 14 extracts the Stokes light ST and the anti-Stokes light AS and separates them.

The Stokes light ST and the anti-Stokes light AS are photoelectrically converted by the photoelectric conversion circuits 15a and 15b, respectively. The photoelectric conversion signals obtained by photoelectrically converting the Stokes light ST and the anti-Stokes light AS are amplified by the amplifier circuits 16a and 16b, respectively. The photoelectric conversion signals amplified by the amplifier circuit 16a and the amplifier circuit 16b are sampled by the A/D conversion circuits 17a and 17b, respectively. The sample data sampled by the A/D conversion circuits 17a and 17b are input into the demodulator 18. Each sample data is demodulated by performing a correlation processing of the sample data and the Golay code used for the code generator 10. The sample data demodulated by the demodulator 18 are input into the averaging circuit 19, and each of sample data groups corresponding to the number of the sampling points set along the longitudinal direction of the optical fiber FB is stored in the averaging circuit 19.

The process described above is repeatedly performed at every the train of light pulses code-modulated using the Golay code is input into the optical fiber FB, and a sample data group corresponding to the number of the sampling points is output from each of the A/D conversion circuits 17a and 17b. The sample data groups associated with the Stoke light ST, which are sequentially output from the A/D conversion circuit 17a, are averaged by the averaging circuit 19 at every sampling point, while the sample data groups associated with the anti-Stoke light AS, which are sequentially output from the A/D conversion circuit 17b, are averaged by the averaging circuit 19 at every sampling point.

After the averaging process by the averaging circuit 19 is finished, a process to correct the deviation of each of the averaged sample data groups (the sample data group associated with the Stokes light ST and the sample data group associated with the anti-Stokes light AS) is performed by the corrector 21. Specifically, the corrector 21 reads out from the storage 20 the correction data AD associated with the temperature indicated by the measured result of the temperature sensor 13b, and performs a convolution of the readout correction data AD and the sample data group associated with the Stokes light ST and a convolution of the readout correction data AD and the sample data group associated with the anti-Stokes light AS.

If the correction data AD associated with the temperature indicated by the measured result of the temperature sensor 13b is not stored in the storage 20, the corrector 21 reads out from the storage 20 a plurality of the correction data AD associated with temperatures close to the temperature indicated by the measured result of the temperature sensor 13b. Then, the corrector 21 obtains a data by interpolating a plurality of the readout data, and performs each of the convolutions described above using this data.

After the process by the corrector 21 is finished, the operation unit 22 calculates an intensity ratio at each of the sampling points (the measuring points) using the sample data group associated with the Stokes light ST corrected by the corrector 21 and the sample data group associated with the anti-Stokes light AS corrected by the corrector 21. Thereby, a temperature at each of the sampling points is obtained. Thereby, the temperature distribution along the longitudinal direction of the optical fiber FB is obtained.

Figure 6:
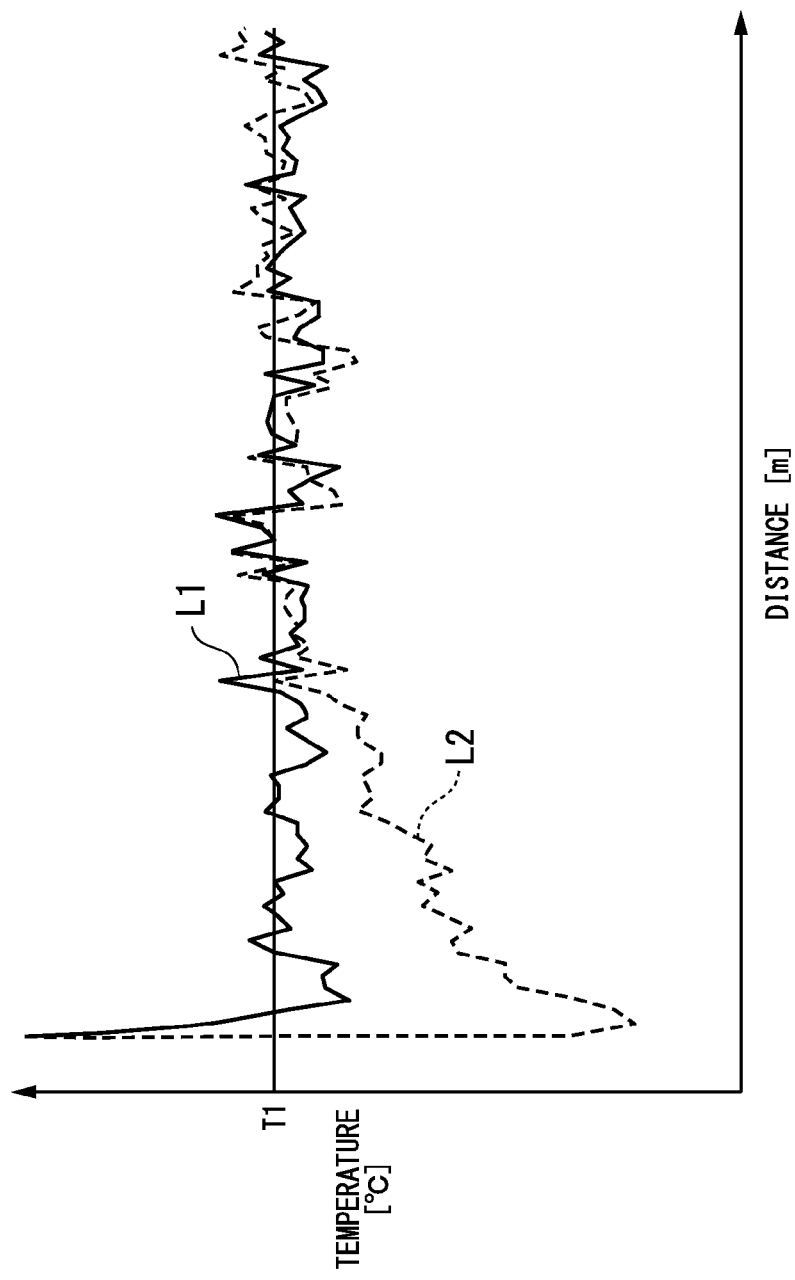
FIG. 6 is a diagram illustrating an example of a measured result of the optical fiber temperature distribution measurement device in accordance with the first embodiment of the present invention.

FIG. 6 is a diagram illustrating an example of a measured result of the optical fiber temperature distribution measurement device in accordance with the first embodiment of the present invention. The measured results illustrated in FIG. 6 are obtained when a temperature of the optical fiber FB is set at a constant temperature T1 (for example, approximately 28° C.). In FIG. 6, a curve indicated by a reference L1 indicates a temperature distribution corrected by the corrector 21, and a curve indicated by a reference L2 indicates a temperature distribution uncorrected by the corrector 21.

FIG. 6 shows that the curve L2 deviates greatly from the temperature T1 at the part near the connector CN of the optical fiber temperature distribution measurement device 1 (the part where the distance is small), while the curve L1 does not far deviate from T1 throughout. This means that the deviation of the sample data group at the loss variation point near the connector CN is corrected appropriately by correcting the sample data group using the correction data AD.

Figure 7:
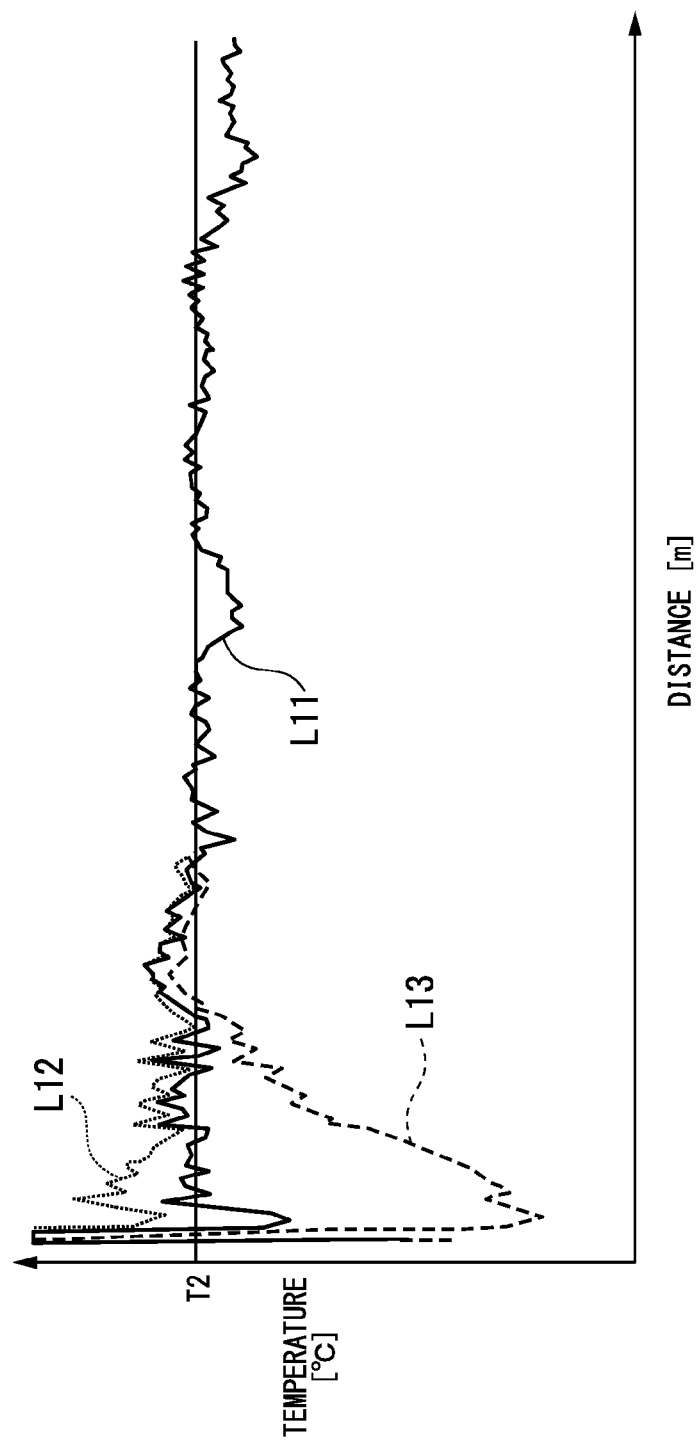
FIG. 7 is a diagram illustrating another example of a measured result of the optical fiber temperature distribution measurement device in accordance with the first embodiment of the present invention.

FIG. 7 is a diagram illustrating another example of a measured result of the optical fiber temperature distribution measurement device in accordance with the first embodiment of the present invention. The measured results illustrated in FIG. 7 are obtained when a temperature of the optical fiber FB is set at a constant temperature T2 (for example, approximately 12° C.) and the internal temperature of the optical fiber temperature distribution measurement device 1 is set at a predetermined temperature TD (for example, approximately 70° C.). In FIG. 7, a curve indicated by a reference L11 indicates a temperature distribution corrected using the correction data AD associated with the temperature TD, and a curve indicated by a reference L12 indicates a temperature distribution corrected using the correction data AD at a temperature which is greatly different from the temperature TD (for example, approximately 25° C.). A curve indicated by a reference L13 indicates a temperature distribution uncorrected by the corrector 21.

FIG. 7 shows that the curve L13, which is similar to the curve L2 illustrated in FIG. 6, deviates greatly from the temperature T2 at the part near the connector CN of the optical fiber temperature distribution measurement device 1 (the part where the distance is small), while the difference of each of the curves L11 and L12 from the T2 is smaller than that of L13 throughout. Comparing the curve L11 with the curve L12, the difference of the curve L11 from the temperature T2 at the part near the connector CN of the optical fiber temperature distribution measurement device 1 is smaller than that of L12. This means that the deviation of the sample data group at the loss variation point near the connector CN is corrected by correcting the sample data group using the correction data AD, but the deviation of the sample data group at the loss variation point near the connector CN is corrected more appropriately by correcting the sample data group using the appropriate correction data AD corresponding to the internal temperature of the optical fiber temperature distribution measurement device 1.

As described above, in the first embodiment, the storage 20 previously stores the correction data AD which corrects the deviation of impulse response obtained at the temperature variation point and/or the loss variation point, and the corrector 21 corrects the deviation of the sample data group (the sample data group associated with the Stokes light ST and the sample data group associated with the anti-Stokes light AS) averaged by the averaging circuit 19 using the correction data AD stored in the storage 20. Thereby, the deviation of sample data group at the temperature variation point and/or the loss variation point can be corrected appropriately in accordance with the features of the light source 11, the optical filter 14, and the photoelectric conversion circuits 15a and 15b, and the accuracy of measurement is improved.

Second Embodiment

Figure 8:
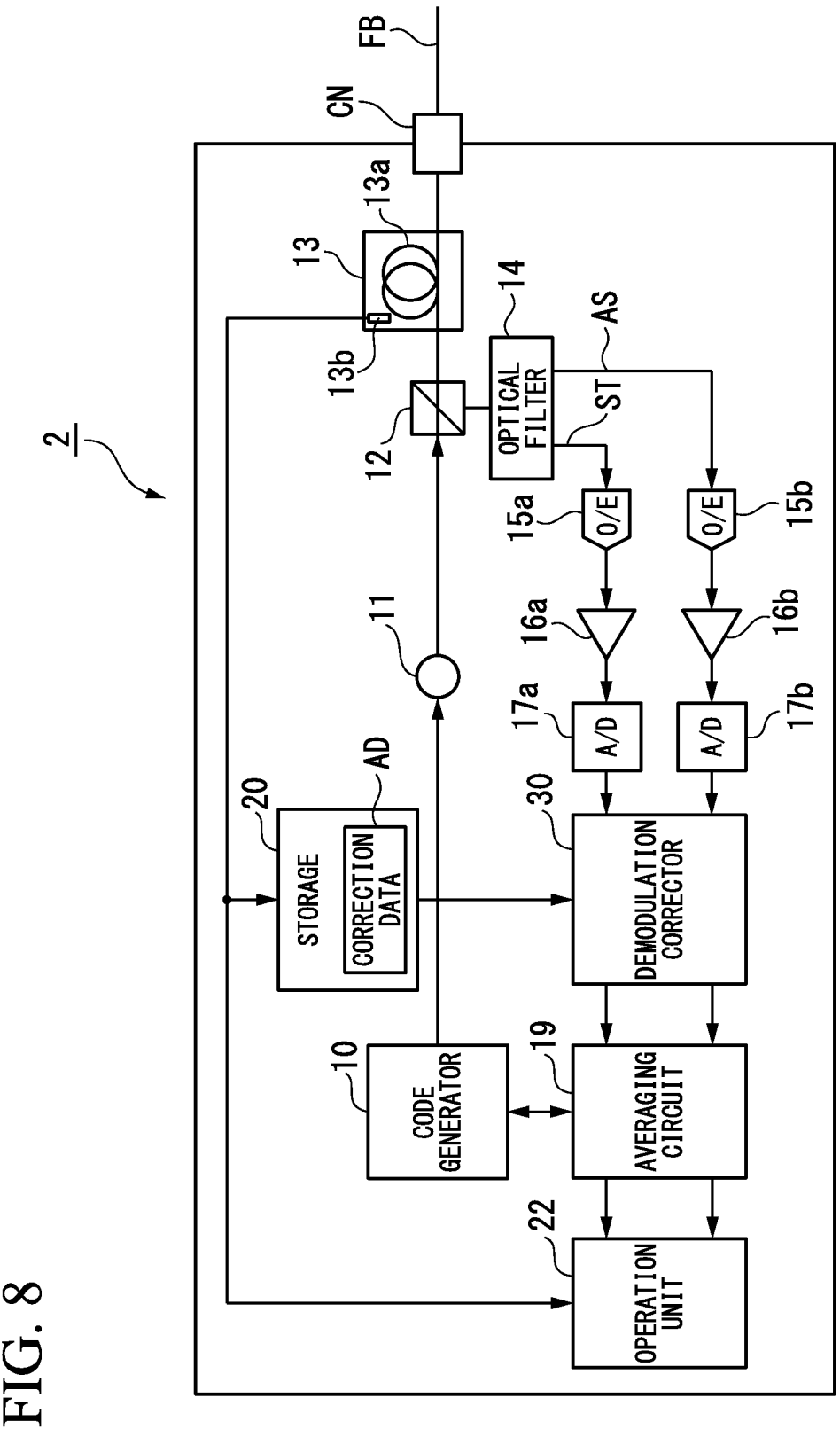
FIG. 8 is a block diagram illustrating main components of an optical fiber temperature distribution measurement device in accordance with a second embodiment of the present invention.

FIG. 8 is a block diagram illustrating main components of an optical fiber temperature distribution measurement device in accordance with a second embodiment of the present invention. As illustrated in FIG. 8, an optical fiber temperature distribution measurement device 2 in accordance with the second embodiment corresponds to a configuration that the corrector 21 is omitted and a demodulation corrector 30 is provided instead of the demodulator 18 in FIG. 1.

The demodulation corrector 30 includes both the function of the demodulator 18 and that of the corrector 21 provided in the optical fiber temperature distribution measurement device 1 illustrated in FIG. 1. Namely, the demodulation corrector 30 is configured to demodulate the sample data output from the A/D conversion circuits 17a and 17b by performing a correlation processing of the sample data and Golay code used for the code generator 10, and to correct each sample data output from the A/D conversion circuits 17a and 17b using the correction data AD stored in the storage 20.

A signal intensity Q2 of the sample data group output from the averaging circuit 19 of the optical fiber temperature distribution measurement device 1 illustrated in FIG. 1 is represented by a following equation (5).

$$Q2 \propto \sum_i \{A0 \otimes [S(A+)_i - S(A-)_i] + B0 \otimes [S(B+)_i - S(B-)_i]\} \quad (5)$$

Given the correction data AD used for the corrector 21 is I, a signal intensity Q3 of the sample data group output from the corrector 21 (the sample data group input into the operation unit 22) is represented by a following equation (6).

$$Q3 \propto \left\{ \sum_i \{A0 \otimes [S(A+)_i - S(A-)_i] + B0 \otimes [S(B+)_i - S(B-)_i]\} \right\} \otimes I \quad (6)$$

The equation (6) may be transformed to a following equation (7).

$$Q3 \propto \sum_i \{(A0 \otimes I) \otimes [S(A+)_i - S(A-)_i] + (B0 \otimes I) \otimes [S(B+)_i - S(B-)_i]\} \quad (7)$$

The equations (6) and (7) show that the sample data group input into the operation unit 22 in case where the correction of the corrector 21 illustrated in FIG. 1 is performed at the subsequent stage of the averaging circuit 19 and that in case where the correction of the corrector 21 is performed at the prior stage of the averaging circuit 19 are same each other. Therefore, in the second embodiment, since the demodulation corrector 30 including both the function of the demodulator 18 and that of the corrector 21 provided in the optical fiber temperature distribution measurement device 1 illustrated in FIG. 1 is provided at the prior stage of the averaging circuit 19, the configuration is simplified. Since the operation of the optical fiber temperature distribution measurement device 2 in accordance with the second embodiment is similar to that of the optical fiber temperature distribution measurement device 1 except that the correction using the correction data AD is performed at the prior stage of the averaging circuit 19, the detail explanation of the operation of the optical fiber temperature distribution measurement device 2 in accordance with the second embodiment is omitted.

In the second embodiment, the storage 20 previously stores the correction data AD which corrects the deviation of impulse response obtained at the temperature variation point and/or the loss variation point, and the demodulation corrector 30 demodulates the sample data output from the A/D conversion circuits 17a and 17b, and, at the same time, corrects the deviation using the correction data AD. Thereby, since the deviation of sample data group at the temperature variation point and/or the loss variation point can be corrected appropriately in accordance with the features of the light source 11, the optical filter 14, and the photoelectric conversion circuits 15a and 15b, the accuracy of measurement is improved.

Hereinbefore, the optical fiber temperature distribution measurement device in accordance with one embodiment of the present invention is described, but the present invention is not limited to the embodiment, and various modifications are included without departure from the spirit of the present invention. The optical fiber temperature distribution measurement device of the present invention may use the Barker code or the like other than the Golay code described above.

What is claimed is:

1. An optical fiber temperature distribution measurement device for measuring a temperature distribution along a longitudinal direction of an optical fiber, the device comprising:
    a light transmitter configured to input a train of code-modulated light pulses into the optical fiber;
    a light receiver configured to receive Raman back scattering lights generated by inputting the train of code-modulated light pulses into the optical fiber;
    a demodulator configured to perform a correlation processing between a measured signal output from the light receiver and a code string associated with a type of the code modulation performed by the light transmitter, and to demodulate the measured signal;
    a storage storing a correction data to be used to correct a deviation of the measured signal output from the light receiver when an impulsive pulsed light is output from the light transmitter, the correction data being associated with temperatures;
    a corrector configured to perform a correction to a demodulated signal output from the demodulator, using the correction data stored in the storage;
    a temperature sensor configured to measure a temperature inside of the optical fiber temperature distribution measurement device and to input the temperature measured into the corrector; and
    an operation unit configured to calculate a temperature distribution along a longitudinal direction of the optical fiber using a corrected signal corrected by the corrector,
    wherein the corrector is configured to read out from the storage the correction data associated with the temperature measured by the temperature sensor and to perform the correction,
    wherein the storage stores a first correction data to be used to correct a deviation of a measured signal associated with stokes light in the Raman back scattering lights and a second correction data to be used to correct a deviation of a measured signal associated with anti-stokes light in the Raman back scattering lights as the correction data, and
    wherein the corrector is configured to correct a demodulated signal associated with the stokes light output from the demodulator using the first correction data, and to correct or a demodulated signal associated with the anti-stokes light output from the demodulator using the second correction data.

2. The optical fiber temperature distribution measurement device according to claim 1, wherein the corrector is configured to interpolate the correction data associated with temperatures close to the temperature measured by the temperature sensor when the temperature measured by the temperature sensor does not correspond to any one of the temperatures, and to perform the correction using the interpolated data.

3. The optical fiber temperature distribution measurement device according to claim 1, wherein the light receiver comprises a first light receiving circuit configured to receive stokes light included in the Raman back scattering lights and a second light receiving circuit configured to receive anti-stokes light included in the Raman back scattering lights.

4. The optical fiber temperature distribution measurement device according to claim 1, wherein the corrector is configured to perform a convolution of the correction data and the demodulated signal and to correct the demodulated signal.

5. The optical fiber temperature distribution measurement device according to claim 1, wherein the light transmitter comprises a code generator and a light source, and
wherein the code generator is configured to generate a driving signal and to input the driving signal into the light source, and the driving signal makes a train of light pulses output from the light source into a train of code-modulated light pulses.

6. The optical fiber temperature distribution measurement device according to claim 5, further comprising an averaging circuit configured to operate by a timing signal from the code generator, to average data output from the demodulator, the data being generated every time each the train of light pulses output multiple times from the light source is input into the optical fiber, and to input the data averaged into the corrector.

7. The optical fiber temperature distribution measurement device according to claim 3, wherein the operation unit is configured to calculate an intensity ratio of a data associated with the stokes light corrected by the corrector and received from the corrector and a data associated with the anti-stokes light corrected by the corrector and received from the corrector, and to calculate the temperature distribution along the longitudinal direction of the optical fiber using the intensity ratio.

8. A method of measuring an optical fiber temperature distribution, comprising:
a step of inputting a train of code-modulated light pulses into an optical fiber;
a step of receiving Raman back scattering lights generated by inputting the train of code-modulated light pulses into the optical fiber;
a step of performing a correlation processing between the measured signal received in the receiving step and a code string associated with a type of the code modulation and demodulating the measured signal;
a step of correcting a demodulated signal demodulated in the demodulating step, using a correction data to be used to correct a deviation of the measured signal, the correction data being associated with temperatures; and
a step of calculating a temperature distribution along a longitudinal direction of the optical fiber using a corrected signal corrected in the correcting step,
wherein the correcting step comprises a step of measuring a temperature inside of an optical fiber temperature distribution measurement device, and a step of correcting the demodulated signal using to the correction data associated with the temperature measured in the measuring step,
the correction data includes a first correction data to be used to correct a deviation of a measured signal associated with stokes light included in the Raman back scattering lights and a second correction data to be used to correct a deviation of a measured signal associated with anti-stokes light included in the Raman back scattering lights,
the receiving step receives stokes light and anti-stokes light in the Raman back scattering lights;
the demodulating step demodulates the stokes light and the anti-stokes light; and
the correcting step corrects a demodulated signal associated with the stokes light using the first correction data, and corrects a demodulated signal associated with the anti-stokes light using the second correction data.

9. The method of measuring an optical fiber temperature distribution according to claim 8, wherein the correcting step interpolates the correction data associated with temperatures close to the temperature measured in the measuring step when the measured temperature does not correspond to any one of the temperatures, and corrects the demodulated signal using an interpolated data.

10. The method of measuring an optical fiber temperature distribution according to claim 8, wherein the correcting step performs a convolution of the correction data and the demodulated signal to correct the demodulated signal.

11. The method of measuring an optical fiber temperature distribution according to claim 8, wherein the inputting step comprises a step of inputting a driving signal into a light source, and a step of outputting a train of code-modulated light pulses associated with the driving signal from the light source.

12. The method of measuring an optical fiber temperature distribution according to claim 8, further comprising, between the demodulating step and the correcting step, a step of averaging the demodulated signals generated every time each the train of light pulses output multiple times from the light source is input into the optical fiber,
wherein the correction step corrects the signal averaged in the averaging step of the demodulated signals.

13. The method of measuring an optical fiber temperature distribution according to claim 8, wherein the calculating step performs an operation to calculate an intensity ratio of a data associated with the stokes light corrected in the correcting step and a data associated with the anti-stokes light in the correcting step and calculates the temperature distribution along the longitudinal direction of the optical fiber.

14. An optical fiber temperature distribution measurement device for measuring a temperature distribution along a longitudinal direction of an optical fiber, the device comprising:
a light transmitter configured to input a train of code-modulated light pulses into the optical fiber;
a light receiver configured to receive Raman back scattering lights generated by inputting the train of code-modulated light pulses into the optical fiber;
a storage storing a correction data to be used to correct a deviation of the measured signal output from the light receiver when an impulsive pulsed light is output from the light transmitter, the correction data being associated with temperatures;

a demodulation corrector configured to perform a correlation processing between a measured signal output from the light receiver and a code string associated with a type of the code modulation performed by the light transmitter and to demodulate the measured signal, and to perform a correction to the measured signal output from the light receiver or the demodulated signal, using the correction data stored in the storage, and a temperature sensor configured to measure a temperature inside of the optical fiber temperature distribution measurement device and to input the temperature measured into the demodulation corrector; and an operation unit configured to calculate a temperature distribution along a longitudinal direction of the optical fiber using a corrected signal corrected by the demodulation corrector, wherein the demodulation corrector is configured to read out from the storage the correction data associated with the temperature measured by the temperature sensor and to perform the correction, the storage stores a first correction data to be used to correct a deviation of a measured signal associated with stokes light in the Raman back scattering lights and a second correction data to be used to correct a deviation of a measured signal associated with anti-stokes light in the Raman back scattering lights as the correction data, and the demodulation corrector is configured to correct a measured signal associated with the stokes light output from the light receiver or a demodulated signal associated with the stokes light using the first correction data, and to correct a measured signal associated with the anti-stokes light output from the light receiver or a demodulated signal associated with the anti-stokes light using the second correction data.

15. A method of measuring an optical fiber temperature distribution, comprising:

a step of inputting a train of code-modulated light pulses into an optical fiber;

a step of receiving Raman back scattering lights generated by inputting the train of code-modulated light pulses into the optical fiber;

a step of performing a correlation processing between the measured signal received in the receiving step and a code string associated with a type of the code modulation and demodulating the measured signal, and correcting the measured signal, using a correction data to be used to correct a deviation of the measured signal, the correction data being associated with temperatures; and a step of calculating a temperature distribution along a longitudinal direction of the optical fiber using a corrected signal corrected in the demodulating and correcting step, wherein the demodulating and correcting step comprises a step of measuring a temperature inside of an optical fiber temperature distribution measurement device, and a step of correcting the measured signal using to the correction data associated with the temperature measured in the measuring step, the correction data includes a first correction data to be used to correct a deviation of a measured signal associated with stokes light included in the Raman back scattering lights and a second correction data to be used to correct a deviation of a measured signal associated with anti-stokes light included in the Raman back scattering lights, the receiving step receives stokes light and anti-stokes light in the Raman back scattering lights;

the demodulating and correcting step demodulates the stokes light and the anti-stokes light, corrects the measured signal associated with the stokes light using the first correction data, and corrects the measured signal associated with the anti-stokes light using the second correction data.

* * * * *